Sept. 11, 1962 A. JURAS 3,053,713
PLASTIC ARTICLES REINFORCED WITH PREFORMED
PRECOMPRESSED METAL FIBER ELEMENTS
Filed Jan. 13, 1958 2 Sheets-Sheet 1

INVENTOR.
Appy Juras,
BY Walter C. Kehm
Attorney

Sept. 11, 1962             A. JURAS             3,053,713
PLASTIC ARTICLES REINFORCED WITH PREFORMED
PRECOMPRESSED METAL FIBER ELEMENTS
Filed Jan. 13, 1958                                2 Sheets-Sheet 2

INVENTOR.
Appy Juras,
BY Walter C. Kehm
Attorney

United States Patent Office 3,053,713
Patented Sept. 11, 1962

3,053,713
PLASTIC ARTICLES REINFORCED WITH PRE-
FORMED PRECOMPRESSED METAL FIBER
ELEMENTS
Appy Juras, Detroit, Mich., assignor to Union Carbide
Corporation, a corporation of New York
Filed Jan. 13, 1958, Ser. No. 708,461
13 Claims. (Cl. 154—43)

This invention relates to metal fiber reenforced plastic compositions suitable for various uses, especially for the production of cast or molded plastic dies, tools, fixtures and other articles; and the invention has reference, more particularly, to novel preformed metallic fiber elements, and to methods of use thereof for incorporation of the same in plastic material as a uniformly distributed reinforcing medium and exothermic heat dissipating means.

In the production of a metal fiber reenforced plastic composite suitable for molding by gravity casting, pressure casting or vacuum pressure casting techniques in the production of dies, tools, fixtures and other articles, it has heretofore been proposed to distribute loose metal fibers in plastic material, comprising e.g. epoxy or polyester resins, with the aim to provide a finished article characterized that the same is smooth, hard, uniform in properties, conforms to a desired configuration, and possesses high impact, wear and abrasion resistance, high thermal conductivity and dimensional rigidity or stability, and can be drilled, machined, turned, filed, sawed, polished, and finished much like a metal article, but easier.

It has also been suggested to metallurgically or otherwise bond loose metal fibers, whereby to produce pliable mats therefrom adapted to be saturated and filled with plastic material, and thus to obtain a metal-fiber-plastic composite, wherein the metal fiber provides a reenforcing and heat dissipating conductive medium. Metal fiber mats thus produced from loose fibers are designed to be applied to irregular pattern surfaces and other mold surfaces, especially when the formed article is of but limited thickness, e.g. not greatly in excess of one-half inch. It has been observed, however, that mats thus produced from loose metal fibers do not possess that high degrees of pliability which is desirable to assure good tailoring and draping characteristics, so that close fitting application thereof to irregular surfaces can be easily attained.

In the above referred to heretofore proposed practices, some difficulties have been encountered. Among these may be mentioned the following:

(1) The difficulty of obtaining uniform distribution of the loose fibers throughout the plastic mass and in desirable oriented relation one to another, so as to assure homogeneity of the composite mass, and uniofrm strength thereof throughout and in all directions.

(2) Present methods require careful loading of the loose metal fibers into a mold in order to obtain uniform distribution thereof, especially when there are sharp variations of contour in the article to be produced, so that metal-poor areas will be avoided; furthermore, when contours of the article to be produced involve wide variation of depth or thickness of the metal fiber-plastic composite in different areas, double or multiple acting pressure application means must be used to uniformly compress the composite mass.

(3) Due to the high bulk factor of loose metal fibers, excessively high mold build-up is required to allow for necessary loaded volume of the fibers.

(4) Excessive spring back of loose metal fibers loaded within a mold requires use of large press daylight and excessively long strokes of the compression plate and ram means to effect the required molding operation.

(5) Abrasion of a mold parting coat is likely to occur during compression of the metal fiber-plastic composite, especially with respect to vertical or near vertical surfaces of the mold and contained pattern.

(6) Wiping away of flocked metal fiber coatings from vertical or near vertical surfaces of the mold and contained pattern (when such coatings are provided) during compression of the metal fiber-plastic composite, is likely to occur.

(7) Loose metal fibers, in forms presently used, due to their high bulk factor, involve difficult storage problems for the users.

(8) With respect to mats, the difficulty of obtaining a high degree of pliability adapted to provide the same with good tailoring and draping characteristics.

The foregoing disadvantages of loose metal fiber-plastic composites have been overcome by the proposals of the instant invention, whereby metal fibers are initially compressed into preformed elements of selected geometrical shape and density.

The preformed metal fiber elements according to this invention can be pressed into many specific shapes, such as spheres, cubes, or other rectangular shapes, multi-faceted shapes or irregular shapes adapted to interlock one with others. The size and form of the selected shape will depend upon the requirements desired to be satisfied with respect to the specific application thereof in use.

The compressed preformed metal fiber elements can be produced from fibers of various selected heat conductive metals or metal alloys. Among the metals which can be used for fiber production, the following are illustrative, viz. steel or stainless steel, copper, silver, nickel, aluminum, as well as metallic alloys such as brass, bronze and other metallic combinations. The metallic fibers may be spun, extruded, cut or drawn fibers, either round, rectangular or of other cross-sectional shape. They should preferably be rough or crimped.

By way of example, to produce comparatively small sizes of preforms, metal fibers selected from the group consisting of steel fibers and aluminum fibers, preferably ranging from $\frac{1}{32}$ of an inch to $\frac{1}{2}''$ in length (although fibers up to a length of 1½ feet can be used), and of one to five mils in cross-sectional dimensions, are, by suitable forming dies, compressed into substantially spherical shape, ordinarily of about $\frac{5}{16}$ of an inch in diameter.

To produce comparatively large sizes of preforms, the individual fibers may be of any desired size, e.g. from about $\frac{1}{32}$ inch in length up to 7 to 8 feet, or even a substantially continuous length of 100 feet or more. The cross-sectional dimensions may also vary over wide limits, but in general, in the case of round fibers, those having diameters between about 0.0005 inch and 0.025 inch are presently preferred. In the case of rectangular fibers, those having cross-sectional areas equivalent to the aforedescribed round fibers are presently preferred. If desired, the metallic fibers may be used in the form of "wool," e.g. the well known steel wool, copper wool, etc. of commerce in which the fibers are of substantially continuous length.

In all sizes of the preforms, sufficient pressure is employed to compress the fibers into a formation such that the initial bulk factor of the consolidated fibers is substantially reduced. For example, the resulting preform may contain 12% to 60% metal fibers by volume, the remainder being voids; the resulting voids being receptive of the plastic material eventually employed to produce the metal fiber-plastic composite. If desired, a mixture of relatively short and long metal fibers can be compressed into preforms of selected shape by pressure sufficiently high that substantially no further compression of the same in use would take place.

In the use of the metal preforms to provide the reenforcing and heat conductive medium of a plastic composite suitable for molding by gravity casting, pressure casting or vacuum pressure casting techniques, a multiplicity of metal fiber preforms of selected geometrical shape, and a selected liquid plastic, e.g. an epoxy resin with an included hardener, are loaded into a mold cavity. The deposited metal fiber preforms will so shift in relation one to another as to readily conform the collective mass thereof to the shape of the mold interior and pattern. The mold having been thus loaded, pressure can be vertically applied to the composite mass of metal fiber preforms and plastic material, by a single action pressure pad, sufficient to consolidate said mass. Application of such vertically applied pressure induces application of laterally directed pressure, one upon another, with respect to tangentially engaged metal fiber preforms, which is effective to press neighboring preforms together, and thereby cause the fibers of each to interlock with those of their neighbors, thus assuring uniform distribution of the reenforcing effect as well as continuity of thermal conductivity of the collective mass of preforms. The interlocking of the preforms can be further assured by interspersing loose metal fibers between layers of the preforms so as to partially fill the interstices therebetween; or the interlocking may be achieved by providing preforms of irregular shape, such e.g. as of star or similar shapes. The effected lateral pressure also is transmitted through the collective mass of metal fiber preforms perpendicularly to any mold release coating or any flocked metal fiber coating which may have been applied to the surfaces of the mold and pattern, thus preventing abrasion of the mold release coating, and keeping in place the flocked metal fiber coating, while at the same time densifying the latter.

It may here be pointed out that the metal fiber preforms may, if desired, be presaturated with the liquid resin plastic before introduction into the mold.

Another method of assuring continuity of reenforcing effect of the collective mass of metal fiber preforms, as well as continuity of heat dissipating paths provided thereby, may comprise metallurgically bonding the preforms together, as by sintering, or by electroplating, vapor plating in vacuum, or by other bonding procedure found to be practical.

For direct contact with irregular surfaces of a pattern contained in a mold, it is desirable to oppose a collective mass of the preformed metal fiber elements of selected shape and small size, such as spherical preforms of small size, e.g. approximating three-sixteenths of an inch in diameter. In such case backing material can be associated with the collective mass of small preforms. By backing material is meant any material which does not involve a "working surface." The term "working surface" refers to that surface or those surfaces of the mold pattern which gives or give the desired form to the articles produced by the molding procedure. The backing material may also comprise preformed compressed metal fiber elements of cubical or rectangular shape of suitable dimensions, which can be packed into the mold interior around and above the collective mass of small preforms which directly contacts the surfaces of a pattern contained in a mold, and when so packed and permeated by the plastic material, will serve to fill out the mold interior.

In addition to the advantages of use of compressed preformed metal fiber elements, to provide the reenforcing and heat conductive medium of a plastic composite suitable for molding by casting techniques, such preformed metal fiber elements can be advantageously used to produce pliable mats suitable for tailored and draped application to irregular surfaces of patterns to be simulated and other mold surfaces.

In the use of the compressed preformed metal fiber elements for production of pliable mats, a layer or layers of preforms of selected size, and according to thickness of mat to be produced, can be arranged in a form of selected area corresponding to the dimensions of the mat to be produced, and said layers being thereupon compressed by pressure applied perpendicularly to the plane of the formed layer or layers thereof. Such applied pressure will laterally expand the individual preforms, and thereby effect tangential engagement of each with others thereof, which engagement tends to interlock the fibers of neighboring preforms, and thereby to unite said preforms in continuously interjoined relation, and thus in mat forming relation. The preforms having interlocked tangency contact one with another, will therefore form a mat structure which will offer little resistance to bending, and consequently will provide a mat of high pliability which can be readily tailored and draped for close and conforming contact application to irregular surfaces and contours of a pattern to be simulated, and to other surfaces of a shaping mold.

Instead of depending solely upon the interjoining effect of interlocking of the fibers of neighboring preforms of a mat layout, the desired interjoining of the preforms can be attained by metallurgically bonding said preforms one to another, as by sintering; or the interjoining can be attained by electroplating, vapor plating in vacuum, or by other suitable bonding procedure.

In the production of mats, the interjoining of neighboring preforms can also be promoted by interspersing loose metal fibers between the preforms or layers thereof, whereby to partially fill interstices therebetween.

By another method of producing mats made up from compressed preformed metal fibers, a reticulate carrier of soft or annealed wire mesh is provided. Within the mesh openings of such mesh, the preforms are disposed. In such case, the preforms will be provided with peripherally indenting grooves to receive the wires of the mesh, so that the latter support said preforms, while, at the same time, allowing some movement of the preforms relative to the mesh, which contributes to the pliability of the resulting mat structure.

The resins employed in accordance with this invention, to provide the plastic composite reēnforced by the compressed preformed metal fiber elements, are thermosetting epoxy resins and thermosetting polyester resins.

The epoxy resins of commerce today can generally be characterized chemically as having a plurality of reactive epoxy groups, that is more than one oxirane group on the resin molecules in which the oxirane oxygen is attached to adjacent carbon atoms of a linear chain or cycloaliphatic ring. They can range from liquid materials to brittle solid resins depending primarily upon the degree of polymerization of the polyepoxy compound used to prepare the resins.

Particularly preferred of these epoxy resins are those characterized as polyglycidyl ethers of polyhydric phenols having the general structure:

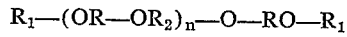

$$R_1—(OR—OR_2)_n—O—RO—R_1$$

where R is the residue of a polyhydric phenol, $R_2$ is an intermediate hydroxyl containing residue of a chlorohydrin or dichlorohydrin, and $R_1$ is mainly an epoxy-containing residue and to some extent a hydroxyl-containing residue derived from the chlorohydrin. In the above formula $n$ represents the extent of polymerization.

Liquid epoxy resins or low melting epoxy resins are regarded as those having a value of $n$ from 0 to about 1. Brittle solid epoxy resins are regarded as those having a value of $n$ from about 2 to about 20.

The polyhydric phenols used in making the epoxy resins may contain the hydroxy groups in one nucleus, as in resorcinol, or in different nuclei of either fused ring systems or ring systems connected by chains composed of one or more atoms. Illustrative of polyhydric phenols which may be used in making the complex polymerization products are mono-nuclear phenols such as resorcinol, hydroquinone, phlorogulcinol, etc., and polynuclear phenols such as bisphenol A,p,p¹-dihydroxy-benzophene, p,p¹-dihydroxy diphenyl, p,p¹-dihydroxy dibenzyl and the polyphenols obtained by the reaction of monohydric mono-nuclear phenols with an unsaturated aldehyde, e.g. acrolein.

The difunctional or polyfunctional chlorohydrins used in making the epoxy resins include epichlorohydrin, glycerol dichlorohydrin, and the like.

The curing of epoxy resins may be divided into two classes—curing with hardeners and curing with catalysts. Hardeners are defined as polyfunctional compounds which are used with an epoxy resin in a stoichiometric or near stoichiometric ratio. Illustrative of hardeners are polyhydric phenols such as resorcinol, bis-phenol A and the like; polybasic acids or their anhydrides such as maleic anhydride, phthalic anhydride, etc.; polyamines containing an active amino hydrogen such as ethylene diamine, diethylene diamine, etc.; polyhydric alcohols and polythiols. Catalysts are defined as compounds that cause the epoxy to self-polymerize. They may be monofunctional and are always used in much lower amounts than stoichiometric. Illustrative of catalysts are the amines, such as trimethyl amine, triethyl amine, etc., alkalies and alkalene reacting substances, such as sodium or potassium hydroxide, etc., boron trifluoride and a variety of others.

In addition to the epoxy resin based on polyhydric phenols, the epoxy resins based on aliphatic polyepoxy compounds such as polybutadiene diepoxide, polyglycidyl acrylates, epoxidized butadiene, epoxidized soy bean oil, and like materials, as well as cycloaliphatic epoxides such as dicyclopentadiene diepoxide, bis-(2,3-epoxycyclopentyl) ether, the 3,4-epoxycyclohexylmethyl 3,4-epoxycyclohexanecarboxylates and related compounds such as 3,4-epoxy-methylcyclohexylmethyl 3,4-epoxy-methyl cyclohexanecarboxylate, with the methyl group in the 1,2,3,4, or 6 position of the cyclohexyl ring, as described in U.S. 2,716,123; the alkane diol bis-(3,4-epoxycyclohexanecarboxylate) compounds such as ethylene glycol bis-(3,4-epoxycyclohexanecarboxylate), the diethylene glycol bis-(3,4-epoxycyclohexanecarboxylate), the triethylene glycol bis-(3,4-epoxycyclohexanecarboxylate), the 2-ethyl-1,3-hexanediol bis-(3,4-epoxycyclohexanecarboxylate), the 3-methyl-1,4-pentane diol bis-(3,4-epoxycyclohexanecarboxylate), the 2-methoxymethyl-2,4-dimethyl-1,5-pentanediol bis - (3,4-epoxycyclohexanecarboxylate), and such other related compounds, as disclosed in U.S. 2,745,847, the bis-(3,4-epoxycyclohexylmethyl) esters of dicarboxylic acids such as bis-(3,4-epoxycyclohexylmethyl) pimelate, bis-(3,4-epoxycyclohexylmethyl) oxalate, bis-(3,4-epoxycyclohexylmethyl) maleate, and such other related compounds, as disclosed in U.S. 2,750,395; triepoxides such as 1,1,1-trimethylolpropane tris-(3,4-epoxycyclohexanecarboxylate) and 1,2,3-propanetriol tris-(3,4-epoxycyclohexanecarboxylate) may be used. Such other epoxy resins as the triglycidyl aniline resins and the triepoxides described in U.S. 2,801,989 may also be used.

It is understood that the epoxy resins used in accordance with this invention may be employed per se, or in admixture.

The unsaturated polyester compositions suitable for use in obtaining the compressed preformed metal fiber reenforced plastic composite according to this invention are the esterification products of ethylenically unsaturated dibasic acids or their anhydrides, such as fumaric acid and maleic anhydride, or mixtures of such acids or anhydrides with saturated acids or anhydrides, such as adipic acid and phthalic anhydride with polyvalent alcohols, usually glycols such as ethylene and diethylene glycol. These polyesters are quite readily soluble in styrene and other vinyl monomers to form resin syrups which in the presence of catalysts and activating agents will polymerize either at room temperatures or by application of heat and slight pressure to a solid infusible plastic. The polymerization is exothermic and no volatile byproducts are formed. Pure glycol maleatestyrene copolymer is rather brittle, but using longer glycols or by replacing part of the maleic acid with long chain aliphatic, acids such as adipic acid, a tougher and more flexible resin is obtained.

The vinyl monomer in the above compositions can be diallyl phthalate which is often used to cross-link the modified maleate polyester resins.

Suitable catalysts for unsaturated polyester compositions as above described are free radical initiators such as peroxides and azo compounds, such as benzoyl peroxide, tertiary butyl perbenzoate, methyl ethyl ketone, peroxide, and the like. Since most unsaturated polyester compositions are unstable on storage, they usually are marketed in liquid form and contain a stabilizing inhibitor such as tertiary butyl catechol, hydroquinone and the like. The curing catalyst is then added just prior to the intended time of using the polyester compositions.

In order to further illustrate this invention, the following description, taken in connection with the accompanying drawings in which like reference characters indicate corresponding parts, is given:

Figure 1:
FIG. 1 shows a compressed preformed metal fiber element of spherical shape.

To produce preformed metal fiber elements of spherical shape (see FIG. 1), preferably of small diametric size, e.g. approximating $3/16''$ in diameter, but optionally of various selected diametric sizes as may be found suitable with respect to given use conditions, metal fibers selected from the group consisting of steel fibers and aluminum fibers ranging from $1/4''$ to $1\frac{1}{2}$ ft. in length are compressed by shaping die means under applied pressure, such that the initial bulk of the metal fibers (2.5 to 1) is greatly reduced, so that the resulting preform contains 12% to 60% metal fibers by volume, the remainder being voids. The spherical shape of such preforms is found to be desirable in that such shape allows the preforms to easily and readily adjust themselves one to another, when forming a collective mass thereof, which is well adapted to assure conforming contact of a mass thereof with irregular contours of a mold pattern or conformation desired to be simulated.

Figure 2:
FIG. 2 one of irregular shape.

Although, in most cases, preforms of spherical shape are probably preferable, preforms of other shapes can be provided, and, if self-interlocking thereof into a collective mass is desirable, the preforms may be of selected irregular shape, e.g. star shaped (see FIG. 2), which shape is adapted to promote tendency of one preform to interlock with adjacent preforms.

Figure 3:
FIG. 3 one of cubical or rectangular shape.

For use as backing material around a collective mass of small size preforms in direct contact with irregular contour of a mold pattern, preforms of relatively large size can be produced in cubical or rectangular block shapes (see FIG. 3), which facilitates build up assembly thereof within a mold interior.

EXAMPLE I

*Production of a Cast Female Section of a Stamping Die*

Figure 4:
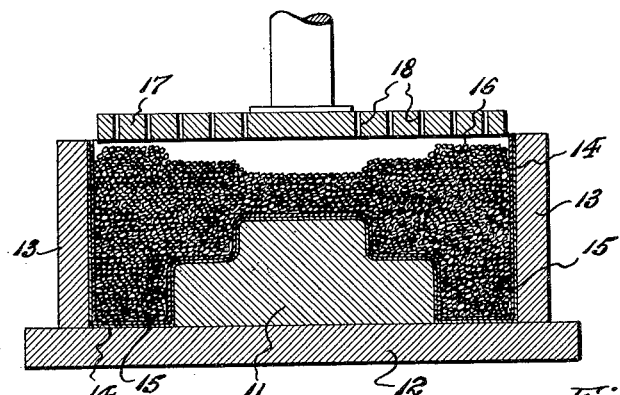
FIG. 4 is a transverse vertical sectional view through a mold containing a mold pattern by which a female stamping die is to be correspondingly shaped, and showing application thereto of a collective mass of compressed preformed metal fiber elements which combine with plastic material to form the female stamping die.

Referring to FIG. 4, a pattern 11 of a male stamping die is cast from a hemp reenforced plaster in conventional manner, and is secured to a suitable mold base 12, upon which surrounding mold walls 13 are erected to form therewith a pattern enclosing mold. A suitable mold release coating 14 is applied to the surfaces of the pattern 11 and to the internal surfaces of the mold cavity. If desired, a flocked metal fiber face coating 15 is overlaid upon the release coating 14. This flocked metal fiber coating may comprise a brushed on 1/32" layer of epoxy resin (ERL-2774, Bakelite Co.) including aromatic amine hardener (ZZLA-0801, Bakelite Co.), this resin layer being flocked with metal fibers (e.g. steel) approximating 1/4" in length. This flocked coating 15 is allowed to react and become tacky by standing 4 to 6 hours at room temperature.

Compressed preformed metal fiber elements, of the general character hereinabove described, are provided, the same being preferably produced e.g. from steel fibers approximating 1/4" in length, and compressed to a spherical shape approximating 3/16" in diameter so that their largest overall dimension is small relative to the shaped plastic mass in which they are to be incorporated.

A liquid plastic composition is prepared by mixing, at room temperature approximately four parts of an epoxy (ERL-2774[1], Bakelite Co.) with one part of amine hardener (ZZLA-0801[2], Bakelite Co.). This liquid epoxy resin composition, in an amount predetermined according to the requirement of the mold cavity size, is introduced into the mold.

The compressed preformed metal fiber elements are slowly introduced into the mold, allowing sufficient time (about 1/2 hour) for the resin composition to be absorbed thereby and to fill the interstices therebetween, thereby to form a collective mass 16 of uniformly distributed preformed metal fiber elements to envelope the pattern 11.

A single flat pressure plate 17, provided with suitably distributed resin escape perforations 18 of diameter less than the diameters of the preformed metal fiber elements, is entered into the mold, for application to the top of the resin charged collective mass 16 of the preformed metal fiber elements, and pressure approximating 300 p.s.i. is slowly applied by this pressure plate, so that the applied pressure effects relative movements of the preformed metal fiber elements in the collective mass thereof, whereby to compel said mass to conform itself intimately and correspondingly to the contours of the pattern 11. When initially forming the collective mass of preformed metal fiber elements within the mold, the distribution of the elements is preferably such that an excess thereof fills the deeper areas of the mold cavity, so that pressure is first applied to the mass in such areas, thus eventually equalizing the pressure with respect to deep areas and areas of lesser depth. By reason of this but a single pressure plate is required which can be actuated by short stroke operation, thus avoiding necessity of employing long stroke double acting pressure pads or plates.

The pressure applied by the pressure plate 17 to the collective mass 16 of preformed metal fiber elements induces exercise of lateral pressure between side by side neighboring elements, whereby to bring said neighboring elements into tangential contact one with another, with tendency to cause their fibers to interlock. This is of advantage in that it tends to uniformly consolidate the collective mass 16, so as to assure continuity of reenforcement provided thereby, while at the same time directing pressure of said mass substantially perpendicular to more or less vertical surfaces of the pattern 11 and mold walls 13. By reason of this abrasion of the mold release coating 14 and of the flocked metal fiber coating 15 is avoided, and such directed pressure not only tends to keep the latter coating in place but also to densify it.

The pressure applied by the pressure plate 17 is maintained for about 18 hours, during which time any excess resin composition is emitted through the perforations 18 of said pressure plate, and collects upon the top of the latter. During this period exothermic reaction of the resin composition takes place. After the resin composition sets, the same is given a post cure of 2 hours at 140° F., and then 4 hours at 300° F., while the pressure plate is held under clamp pressure.

The post cure being completed, the produced female section of the stamping die is removed from the mold, and will be found to contain a reenforcing metal fiber content approximating 60% by weight. It will also be seen that the external corners of the produced die section are well filled out, and comprise uniform epoxy resin and metal fiber composition in contrast to corners of a similar cast die section produced from the resin and loose metal fibers, wherein the corners comprised almost pure resin, i.e. lacking in any appreciable amount of reenforcing metal fiber.

As an alternative to the step of introducing the preformed metal fiber elements into the liquid resin composition previously supplied to the mold, said elements can be first impregnated with the liquid resin composition before introduction into the mold, allowing the resin to contact said elements about 20 to 40 minutes, so as to assure complete saturation of the latter.

As an alternative to the step of charging the liquid resin composition prior to addition of the preformed metal fiber elements, said elements can all be charged into the mold and 200–300 p.s.i. pressure applied by means of pressure plate 17 to densify the preformed metal fiber mass and compel said mass to conform itself to the contours of the pattern 11. In this case, however most of the openings 18 in the pressure plate 17 would be closed so as to form a closed mold, merely leaving selected openings 18 open through which the liquid resin composition can be forced under pressure into the mold, the latter being previously evacuated to remove air, thus causing the resin to uniformly permeate the whole mass of compressed metal fiber elements. This can be done in from 1/2 to 2 hours. The impregnated mass would then be cured as previously described.

It is also pointed out that in the production of the preformed metal fiber elements sufficiently high pressure can be applied in shaping the same that no further compression is likely to occur thereafter. In such ease, short loose metal fibers could be interspersed through the collective mass of preformed metal fiber elements before or while introducing the latter into the mold, whereby to assure uniformity of reenforcement distribution within the cast article.

EXAMPLE II

*Production of a Cast Article of Large Size*

Figure 5:
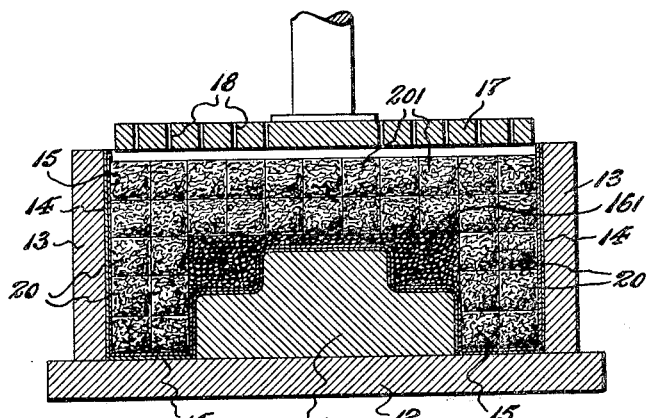
FIG. 5 is a view similar to that of FIG. 4, but showing a collective mass of compressed preformed metal fiber elements of small size opposed to the male pattern, and surrounded by backing material comprising compressed preformed metal fiber elements of block form and relatively large size, adapted to provide backing material.

When an article of large size is to be produced and requires a mold of large size, the technique described in connection with above Example I can be used, subject to the following modification (see FIG. 5):

In loading the mold with preformed metal fiber elements, rectangular block-like preformed metal fiber elements 20 (see FIG. 3) of relatively large size are arranged within the mold cavity in built up assembly, intermediate the side walls 13 of the mold and the pattern 11, so as to surround the latter. This having been done, a collective mass 161 of small size preformed metal fiber elements, preferably of spherical shape, is deposited in the bottom of the space bounded by the surrounding block-like elements 20, so as to cover the exposed surfaces of the pattern 11 to a substantial depth, whereafter additional block-like preformed metal fiber elements 201 are filled in said space above and across the collective mass 161 of said small preformed metal fiber elements. The thus assembled block-like elements 20 and 201 provide a large bulk of metal fiber reenforcing material, by which the pattern covering collective mass 161 of small size elements is surrounded and backed. The assembly of large size elements 20 and 201 and the collective mass 161 of small size elements are charged with the liquid resin composition, and then pressure is applied to consolidate these materials, and to force the collective mass 161 of the small elements into conforming contact with the contours of the pattern 11 to which said mass is opposed. After the mold is thus loaded, the curing techniques described in Example I are carried out to complete the cast article.

EXAMPLE III

Producing Pliable Mats of Preformed Metal Fiber Elements

Figure 6:
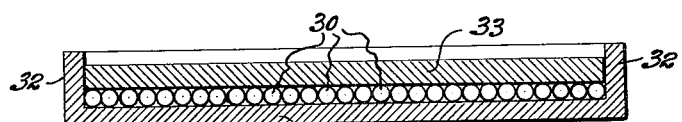
FIG. 6 is a transverse vertical sectional view of a form for assembling a layer of compressed preformed metal fiber elements and processing the same to interjoin them to provide a pliable mat body.
Figure 7:
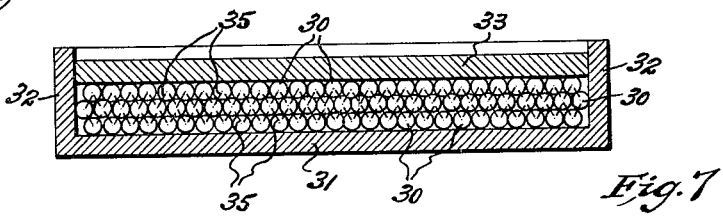
FIG. 7 is a view similar to that of FIG. 6, but showing the assembly and interjoining of a plurality of layers of the compressed preformed metal fiber elements to form a pliable mat body.
Figure 8:
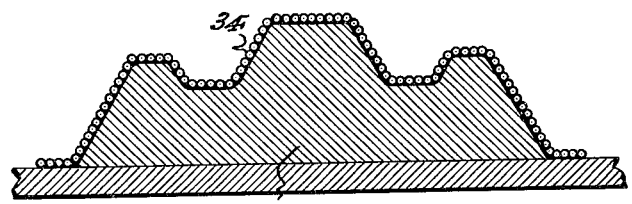
FIG. 8 is a fragmentary sectional view showing application of a pliable mat body, produced from assembled and interjoined compressed preformed metal fiber elements, to a molding pattern of irregular contour.

Referring to FIGS. 6, 7 and 8, methods of producing pliable mats from compressed preformed metal fiber elements, and the use of such mats is illustrated. The mats so produced are well adapted for application to patterns of irregular contour, as and for purposes already hereinabove mentioned incidental to molding various articles comprising a plastic composition reenforced by incorporated metal fiber material.

To produce a simple and relatively thin pliable mat structure, a multiplicity of compressed preformed metal fiber elements 30, of selected shape and size, e.g. of spherical shape, are assembled together, in side by side relation, to dispose the same in a flat plane layer formation (see FIG. 6) within a frame of dimensions defining the dimensions of the mat to be produced. The frame preferably comprises a base 31 and upstanding peripheral walls 32. The layer of preformed metal fiber elements having been laid out within said frame, a pressure plate 33, of corresponding areal dimensions, is overlaid upon said layer. Downwardly directed force is applied to the pressure plate 33, and thereby transmitted to the layer of preformed metal fiber elements 30, whereby to induce lateral expansion of the individual elements. Such lateral expansion of the elements effects interlocking of the surface fibers of tangentially abutting elements, and thus bonds said elements together in interjoined mat forming relation. Firmer bonding can be attained metallurgically, as by sintering the formed mat, or by electroplating, vapor plating in vacuum, chemical plating, or by other suitable bonding procedure.

Since the metal fiber elements thus bonded or joined together into mat formation are merely in tangency engagement one with another, the resultant mat 34 (see FIG. 8) offers little resistance to bending, and therefore can be easily applied in closely conforming contact with the varying contours and angularly related surfaces of a pattern 111 (again see FIG. 8). The mat can be saturated with the liquid resin composition, either before or after application thereof to the pattern 111.

If a mat of thickness greater than the diameters of the preformed metal fiber elements 30 is desired to be produced, a plurality of superposed layers of the elements can be formed in the frame 31—32, and then united by pressure applied by means of the pressure plate 33 (see FIG. 7).

In both the single and multiple layer mat formation, loose metal fibers 35 (see FIG. 7) can be flocked on the layer or between layers of the preformed metal fiber elements 30 before element uniting pressure is applied thereto.

EXAMPLE IV

Figure 9:
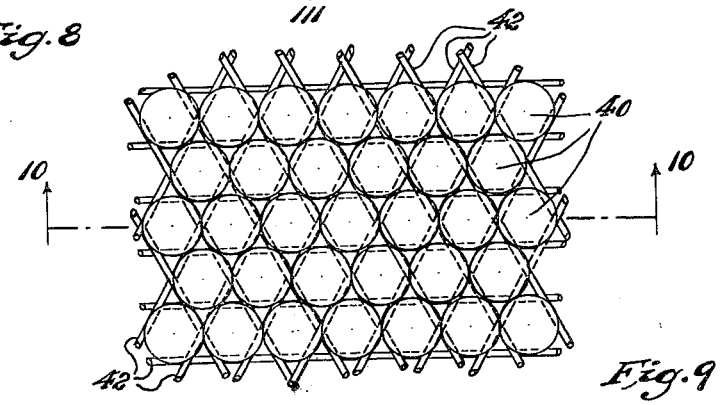
FIG. 9 is a fragmentary plan view of a modified construction of pliable mat produced from compressed preformed metal fiber elements.
Figure 10:
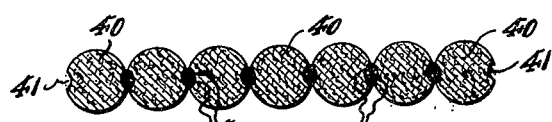
FIG. 10 is a sectional view of the same, taken on line 10—10 in FIG. 9.

Another Form of Pliable Mat Produced From Compressed Preformed Metal Fiber Elements Another method of forming a mat comprising compressed preformed metal fiber elements is shown in FIGS. 9 and 10. In this case, the preformed elements 40 are, in the shaping thereof, provided with encircling grooves or channels 41. An open mesh fabric, produced from interwoven or otherwise assembled flexible soft annealed wires 42, of suitable mesh opening size and shape, is provided. The grooved elements 40 are inserted in the mesh openings, so that their grooves receive and embrace contiguous wires 42 of the mesh fabric, whereby the elements 40 are supported by the wires of the fabric, while nevertheless having tangency contact one with another.

In this case, the compressed preformed metal fiber elements 40 can be of any suitable diametric size for assembly with a wire mesh fabric having correspondingly sized mesh openings to receive and support said elements.

The mat formation so produced can be compressed to join contiguous preformed metallic fiber elements one to another by interlocking together the surface fibers of said elements, or otherwise bonding said elements one to another.

The mat formation so produced is well adapted for application to patterns of large size and irregular contour, and, in such application, if tangency contact of neighboring preformed metal fiber elements is lost when bending the mat around sharp or severe angular contours of a pattern, nevertheless the wire mesh fabric will maintain the integrity of the mat, and will prevent rupture thereof.

Having now described this invention, what is claimed is:

1. In combination with a mass of plastic composition shaped to conform to a molding pattern having reinforcing and heat dissipating means incorporated therein, said means comprising a multiplicity of precompressed preformed metal fiber elements of selected geometric shape substantially smaller than the said mass and having a bulk density substantially greater than that of uncompressed metal fibers from which said elements are made such that the said preformed elements contain from 12 to 60 percent by volume of metal fibers, the remainder being voids; said preformed metal fiber elements being disposed in peripheral contact one with another and adapted to interlock therewith to form a collective mass thereof, and said mass being compressed to bind the contacting preformed fiber elements together by the mutual interlocking of fibers thereof, with the voids remaining in said compressed mass being substantially filled with said plastic in set and cured condition.

2. The combination according to claim 1 wherein the plastic composition is a thermosetting resin selected from the group consisting of epoxy resins and polyester resins.

3. The combination according to claim 1 wherein the mass of preformed metal fiber elements are further bound together by a metallurgical bond.

4. The combination according to claim 1 wherein the preformed metal fiber elements are produced from steel fibers ranging from a length from ¼" to 1.5 feet, and said elements are of small diametric size.

5. The combination according to claim 1 wherein the pattern engaging preformed metal fiber elements are of small size spherical shape, and the collective mass of preformed metal fiber elements includes relatively large size preformed metal fiber elements of selected geometric shape disposed to envelop the mass of those of said small size spherical shape.

6. A pliable mat for the purposes described comprising in combination a carrying open mesh soft wire fabric and compressed preformed elements each consisting essentially of a mass of metal fiber and having voids dispersed therein entered in the mesh openings of said fabric, said elements having annular grooves to receive wires of said fabric, whereby the elements are supported by said wires, neighboring supported elements being disposed in abutting contact and bonded together by mutual interlocking of fibers thereof, said elements being saturated with a thermosetting resin, selected from the group consisting of epoxy resins and polyesters the resin being cured to set condition.

7. A pliable mat according to claim 6 wherein the preformed metal fiber elements are of spherical shape of selected size produced from steel fibers.

8. The method of producing a mold including a pattern to be reproduced comprising enveloping the pattern with a collective mass of precompressed preformed metal fiber elements of selected geometric shape substantially smaller than said mass and having a bulk density substantially greater than that of uncompressed metal fibers from which said elements are made such that the said preformed elements contain from 12 to 60 percent by volume of metal fibers, the remainder being voids, said elements being engaged in peripheral contact one with another and adapted to interlock therewith, impregnating the mass of preformed metal fiber elements with a liquid thermosetting resin selected from the group consisting of epoxy resins and polyester resins, and thereafter subjecting the resin impregnated mass of preformed metal fiber elements to sufficient pressure to bind the preformed fiber elements together by mutual interlocking of fibers thereof and then curing the resin to set condition, whereby the incorporated bonded preformed metal fiber elements both reinforce the mold body and promote thermal conductivity thereof.

9. A method as defined by claim 8 wherein the preformed metal fiber elements are of spherical shape and are produced from steel fibers.

10. A method as defined in claim 8 wherein the collective mass of precompressed preformed metal fiber elements are first compressed before impregnating the mass by applying pressure to the layer perpendicular to the plane of the pattern to bring neighboring elements into abutting peripheral contact and bonded engagement with one another.

11. A method as defined in claim 10 wherein the preformed metal fiber elements are of spherical shape and are produced from steel fibers.

12. The method of producing a mold including a pattern to be reproduced comprising superimposing upon the pattern, a collective mass of precompressed preformed metal fiber elements of substantially spherical shape, relatively small size and of selected density substantially greater than that of uncompressed metal fibers from which said elements are made such that the preformed elements contain from 12 to 60 percent by volume of metal fibers, the remainder being voids, backing said collective mass with an assembly of relatively large size precompressed preformed fiber elements of block shape to complete the mold body wherein the elements are engaged in peripheral contact one with another and adapted to interlock therewith, impregnating the preformed metal fiber elements of the mold body thus formed with a liquid thermosetting resin selected from the group consisting of epoxy resins and polyester resins, and thereafter subjecting the resin impregnated preformed metal fiber elements of the body formed thereby to sufficient pressure to bind the preformed fiber elements together by mutual interlocking of fibers thereof and then curing the resin content of the body to set condition, whereby the incorporated bonded preformed metal fiber elements both reinforce the mold body and promote conductivity thereof.

13. A method as defined in claim 12 wherein the preformed metal fiber elements are of small diametric size and produced from steel fibers of a length from ¼" to 1.5 feet.

References Cited in the file of this patent

UNITED STATES PATENTS

| | | |
|---|---|---|
| 853,003 | Collins | May 7, 1907 |
| 1,112,772 | Crane | Oct. 6, 1914 |
| 1,215,064 | Ryan | Feb. 6, 1917 |
| 1,839,404 | Mazer | Jan. 5, 1932 |
| 2,028,240 | Palmer | Jan. 21, 1936 |
| 2,263,792 | Wood | Nov. 25, 1941 |
| 2,428,654 | Collins | Oct. 7, 1947 |
| 2,431,474 | Gaudenzi et al. | Nov. 25, 1947 |
| 2,528,183 | Schmidt | Oct. 31, 1950 |
| 2,571,335 | Browne | Oct. 16, 1951 |
| 2,639,252 | Simon et al. | May 19, 1953 |
| 2,731,682 | Evans | Jan. 24, 1956 |
| 2,751,626 | Lyijynen et al. | June 26, 1956 |
| 2,836,529 | Morris | May 27, 1958 |
| 2,901,455 | Jurras | Aug. 25, 1959 |
| 2,967,756 | Mazzucchelli et al. | Jan. 10, 1961 |

FOREIGN PATENTS

| | | |
|---|---|---|
| 489,721 | Great Britain | Aug. 2, 1938 |